Dec. 1, 1970                J. H. WALSH                3,543,455
                          AIRPLANE HANGAR
                        Filed Feb. 17, 1969
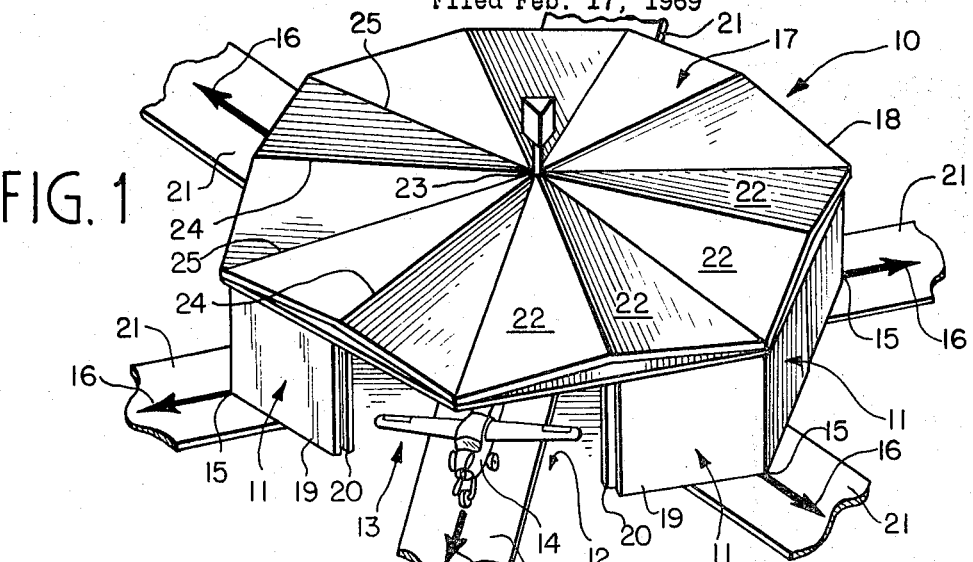
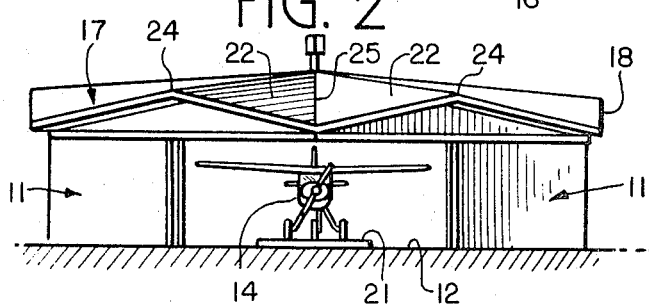
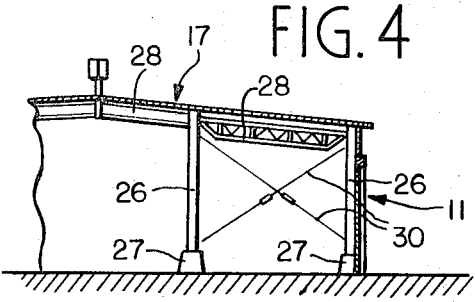
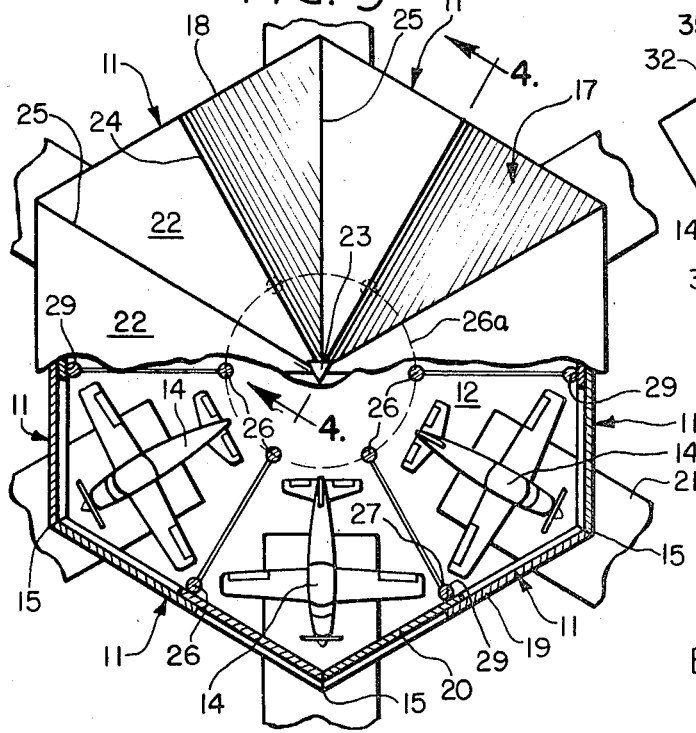
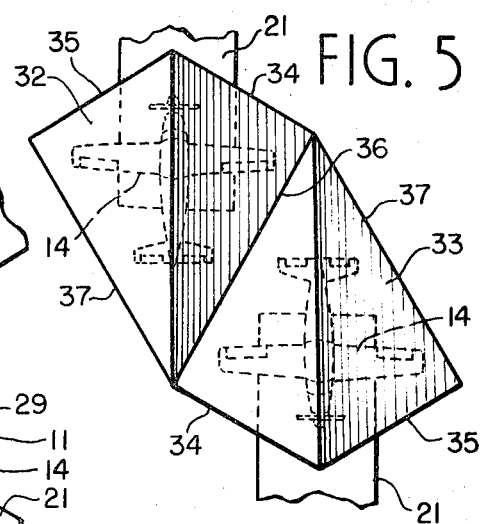
Inventor
James H. Walsh
By Hugh H. Drake
                Attorney

United States Patent Office 3,543,455
Patented Dec. 1, 1970

3,543,455
AIRPLANE HANGAR
James H. Walsh, 1442 Sharpe Place,
Longmont, Colo. 80501
Filed Feb. 17, 1969, Ser. No. 800,008
Int. Cl. E04b 7/00; E04h 6/44
U.S. Cl. 52—64
2 Claims

ABSTRACT OF THE DISCLOSURE

An airplane hangar has its walls arranged to define a hexagon. Moreover, the walls are composed of sliding doors so that adjacent doorways may be opened in a pair of adjacent walls to define an opening that permits ingress and egress of an airplane across one corner of the hexagonal area. Also shown are other overall hangar shapes made up of individual modules each of which are similar to the different individual modules that make up the aforedescribed hexagonal hangar.

---

The present invention pertains to an airplane hangar. More particularly, it relates to a hangar that may be composed of a plurality of individual modules each designed to receive an individual airplane.

With the rapid growth of both private and commercial aircraft operations, the demand for hangar space has similarly increased. This has put a premium upon land adjacent to the runway and loading area. At the same time, the continually increasing cost of both land and structures has made it increasingly difficult economically to provide adequate hangar space for the shelter, servicing and repair of aircraft, and it has tended to make the cost for the use of such space increasingly expensive to the owners of the aircraft.

It is, accordingly, a general object of the present invention to provide a new and improved airplane hangar that meets standard requirements for its use and yet which is economical in terms both of necessary land area and expense of construction.

Another object of the present invention is to provide a new and improved airplane hangar that permits ease of both construction and maintenance.

A specific object of the present invention is to provide a new and improved airplane hangar that accepts a maximum number of airplanes for a minimum amount of floor, wall and roof areas.

An airplane hangar constructed in accordance with the present invention includes protective means forming modules of a size to receive an airplane and in a horizontal plane together defining a five or more sided polygonal shape. The hangar also has sliding doors included in the modules to define vertically-oriented continuous openings. Each opening extends through both adjacent sides of one of the pairs of sides and extends upward from the bottom of the module. The opening enables ingress and egress of the airplane through the opening and across the apex of the one pair of sides.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of one embodiment of an airplane hangar;

FIG. 2 is a front elevation view of the hangar shown in FIG. 1;

FIG. 3 is a plan view, partially broken away, of that same hangar;

FIG. 4 is a fragmentary cross-sectional view taken along the line 4—4 in FIG. 3; and FIG. 5 is a plan view of an alternative embodiment of an airplane hangar.

As shown in FIGS. 1–4 for the purpose of illustrating a specific embodiment of the present invention, an airplane hangar 10 includes a plurality of individually-straight walls 11 joined end-to-end to encompass a horizontal or ground area 12 of polygonal, and in this case specifically of hexagonal, shape. A continuous doorway 13 is created through adjoining portions of each adjoining pair of walls 11 so as to enable ingress and egress of an airplane 14 through opening 13 and across a corresponding corner 15 of the enclosed hexagonal area as indicated by arrow 16 in FIG. 1. Completing the enclosure of the hangar space is a covering roof 17 the external periphery 18 of which in this case is of matching hexagonal shape.

While doorways 13 could be hinged so as to swing open or be constructed of flexible panels movable to an overhead storage position, in accordance with the invention, they are composed of mating parallel panels 19 and 20 movable alongside one another to define the continuous opening or doorway 13. Such sliding doors are economical to construct, they require a minimum of additional space to accommodate them when in either the telescoped open or the closed positions and, when closed, they serve as a fully-protective wall. A strip 21 of pavement, disposed on the ground and projecting into each doorway 13 at least to a point beneath the airplane's wheels, serves as a ramp on which the airplane is towed or otherwise moved into and out of the hangar.

Roof 17, in the embodiment shown, is composed of a plurality of triangularly-shaped flat panels 22 that have a common center 23 and are disposed side-by-side with successively alternate slopes so as to create, in corresponding successive alternation, a plurality of ridges 24 and valleys 25. If desired, the relative positions of ridges 24 and valleys 25 may be reversed.

Supporting roof 17 from the ground are a plurality of vertical support columns 26 projecting upwardly from concrete foundations 27 and carrying between their upper end portions girders 28 upon which panels 22 are secured. The different ones of columns 26 are disposed only along lines that constitute radii extending between center 23 of the hexagonal area and points 29 (FIG. 3) located intermediate the horizontal lengths of each respective wall 11. Each adjacent pair of such radii defined by columns 26 together with the adjacent ones of each adjacent pair of sliding doors 19 and 20 define a module of a size to receive an airplane and which in a horizontal plane has a diamond shape; the pair of sides of the diamond defined by those two radii are longer than the opposite pair of adjacent sides of the diamond defined by the doors. In this case, the entire hangar is composed of six such modules disposed side-by-side with adjacent pairs sharing common radii and with all the modules together forming the external periphery of hexagonal shape. Accordingly, the illustrated hangar accommodates six airplanes. Nevertheless, when it is necessary to include a large amount of shop equipment or the like for major overhaul or repair work, one of the modules may be used for that purpose.

Again for purposes of economy, the space between adjacent columns along the same radii is left open except in this case for strength-giving crossed tension rods 30. If desired, however, a wall may be constructed between such adjacent columns so as to be disposed along the longer sides of each module. Such a wall may extend either all the way between point 29 and center 23 or only as far as the inner one of columns 26. In the latter event, an additional wall section, preferably including a doorway sufficiently large to accommodate a person, may also be constructed between adjacent ones of the innermost columns 26 so as to permit the formation of a lockable enclosure around each airplane; this leaves a common central work area for tools, servicing equipment and the like around the center 23 within the innermost ones of the columns, as generally indicated by dashed circle 26a. In a still different alternative, the roof and wall-defining structure may be supported in the manner of a cantilever from one or more centrally-located columns. In any event, all roof-supporting structure and other elements are so located that an unobstructed area generally in the form of the diamond-shaped module is provided for parking the airplane, and the two shorter sides of the module, which constitute respective parts of the external wall periphery, are formed in a manner so that when opened the airplane may be moved across that which constitutes a corner or apex 15 of the hexagonal periphery.

By reason of the typical form factor of at least most aircraft now in common use, the diamond-shaped module results in minimizing the wall and roof areas as well as the total area of ground covered by the structure, while still leaving a reasonable amount of space in the module, directly behind the airplane as shown in the drawings, for the storage of items necessary to at least service the airplane. By the "form factor" is meant the position and length of the wings relative to the length of the fuselage and the length of the elevator at the rear end of the fuselage. Moreover, the arrangement of a plurality of the individual modules into a polygon constitutes a highly-efficient multi-plane hangar, again in terms of minimizing wall, roof and ground area utilized so as, in turn, to enable maximum economy of construction and maintenance. The polygonal structure also has the advantage that the small storage areas at the rear of the airplane in each individual module may be combined so as to provide the aforementioned common work area in which larger items of service equipment may be located. Furthermore, the specific hexagonal shape results in optimizing the economic features mentioned, again as a result of the actual airplane form factors encountered; however, future airplane design changes might render some other version, such as an octagon, most efficient.

Although not within the scope of the invention claimed, a significant degree of the attendant economies are realized when a fewer number of the basic modules are combined to provide hangar space for as few as only one or two planes. Thus, a two-plane hangar is depicted in FIG. 5. It is constructed so as to define a pair of the diamond-shaped modules 32 and 33 joined together in a manner to share an adjacent pair of their longer sides. The structure forming their shorter sides 34 and 35 again is formed so as to provide a continuous opening through both of those sides and extending upward from the ground or bottom of the module so as to enable ingress and egress of the airplane through the opening across the apex of the walls defining each pair of adjacent sides 34 and 35. In the specific case of the FIG. 5 arrangement, a modified form of door construction is preferred because of the lack of a straight wall section embracing portions of two adjacent modules as is the case with the hexagon-shaped hangar. That is, a door arranged for overhead storage or one composed of a plurality of hinged vertical panels is preferable. In any event, any and all roof-supporting and other structures are alined with the longer sides 36 and 37 of the modules, in correspondence with the alinement of columns 26 along the radii in the hexagon case, so as to leave the space within the module itself unobstructed.

Other combinations of two or more of the individual diamond-shaped modules, that achieve structural economy by sharing common sides as well as by resorting to the diamond shape for each individual module, will now become apparent. For a desired particular number of individual modules, the ultimate external peripheral shape to be chosen for such a multi-plane structure is found by placing the different individual-module shapes together in various combination until that combination is achieved which occupies minimum ground area. Having thus determined the horizontal shape, a suitable roof shape, when used, is selected; like in FIG. 1, this may be a series of flat panels defining alternate peaks and valleys with the relative positions of those peaks and valleys in either order or perhaps combined as to order so as to facilitate the roof construction over a hangar of resultant irregular or asymmetric shape.

It is to be particularly noted that the individual modules are described herein as defining a diamond shape. This they do, even though a portion of the diamond may be physically omitted. That is, the modification mentioned with regard to FIG. 3, wherein the inner portion of each module is walled off to define central work area 26a, still features modules that "define" a diamond shape although they physically may have five walls. Similarly, the hangar of FIG. 5 may be modified so that each module has five walls while still defining a diamond shape by means of four of those walls; in that case, the two common sides of adjacent modules preferably are still coextensive.

The use of the diamond-shaped module results in economy in the cost of construction of both the roof and the vertical side walls. That is, the diamond-shaped modular pattern is still advantageous in the case of a structure in which the doors are omitted so that the walls are open over all or part of the periphery. This may be done when the roof is necessary to guard against precipitation but physical wall structures are unnecessary by reason of the existence of nearby objects that afford adequate shielding against wind. Conversely, a situation may exist in which closeable walls are required to protect against excess wind while precipitation is so scant as to make a roof unnecessary. Moreover, when a roof is included over the airplanes housed in a polygonal version, it may when desired for economy be omitted over the common central area 26a.

All of the economies and other features attendant to the use of the diamond-shaped modules in the formation of the walls and the doors therein may be retained, while for some other reason constructing the roof to have an external periphery of other than that corresponding to the boundaries of the polygonal segments. For example, available construction materials and fabrication techniques might render it even more economical to form the roof for the hexagonally shaped hangar of FIGS. 1 to 4 as a segment of a sphere, in which case it could be that no useful purpose would be served, and it might even be disadvantageous, to expend the necessary effort to sever a series of chord sections from the sphere periphery simply to achieve a hexagonal roof shape. Thus, even with the roof formed as a sphere section or in some other manner such that its periphery is other than polygonal, all of the advantages of the use of the diamond-shaped modules are retained with respect to ground area actually occupied and building wall costs.

Although several forms of airplane hangars have been described, they share the common concept of utilizing a diamond-shaped module to receive each airplane. For the reasons indicated, this leads to maximized efficiency and economy. The variety of module combinations available affords great flexibility in meeting different airport situations. The overall shape can be selected to accommodate peculiar land features such as slopes, nearby structures, wind patterns and prevailing snowdrifts. Adjacent hangars can be mutually shaped and located so as to permit proper ingress and egress while yet conserving land area by employing overlapping traffic patterns. All these features are particularly attractive and valuable under present-day circumstances wherein airport facilities have become highly congested and the costs to the aircraft owners have severely increased.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. An airplane hangar comprising:
a plurality of individually straight vertical walls greater than four in number and joined end-to-end to encompass a horizontal area of polygonal shape;
sliding doors defining continuous doorways through adjoining portions of adjoining pairs of said walls and openable to enable sequential ingress and egress of airplanes individually through respective ones of said doorways and across respective adjacent corners of said polygonal area, each wall of said adjoining pairs of walls being composed of a pair of parallel door panels movable alongside one another so that each of said doorways is opened by telescoping together the respective door panels of both of the corresponding adjacent pair of walls;
a roof disposed across the top of said walls over said area;
and vertical supports for said roof disposed only along radii extending between the center of said area and points intermediate the horizontal length of said walls and between said corners.

2. An airplane hangar as defined in claim 1 in which said vertical supports include columns disposed on said radii inwardly from said walls but spaced from said center to leave a central area free of obstruction.

References Cited
UNITED STATES PATENTS

| | | | |
|---|---|---|---|
| 1,773,656 | 8/1930 | Wasilkowski | 52—73 X |
| 1,780,102 | 10/1930 | Watt | 52—234 X |
| 1,837,152 | 12/1931 | Ellsworth | 52—237 X |
| 2,282,756 | 5/1942 | Curran | 52—82 X |
| 2,420,186 | 5/1947 | Miller | 52—237 X |
| 3,299,585 | 1/1967 | Wilkins | 52—73 X |
| 3,461,626 | 8/1969 | Aitken | 52—82 |

FOREIGN PATENTS

Ad. 51,078  1941  France.
730,879  1932  France.

JOHN E. MURTAGH, Primary Examiner

U.S. Cl. X.R.

52—82, 237